United States Patent Office 3,394,208
Patented July 23, 1968

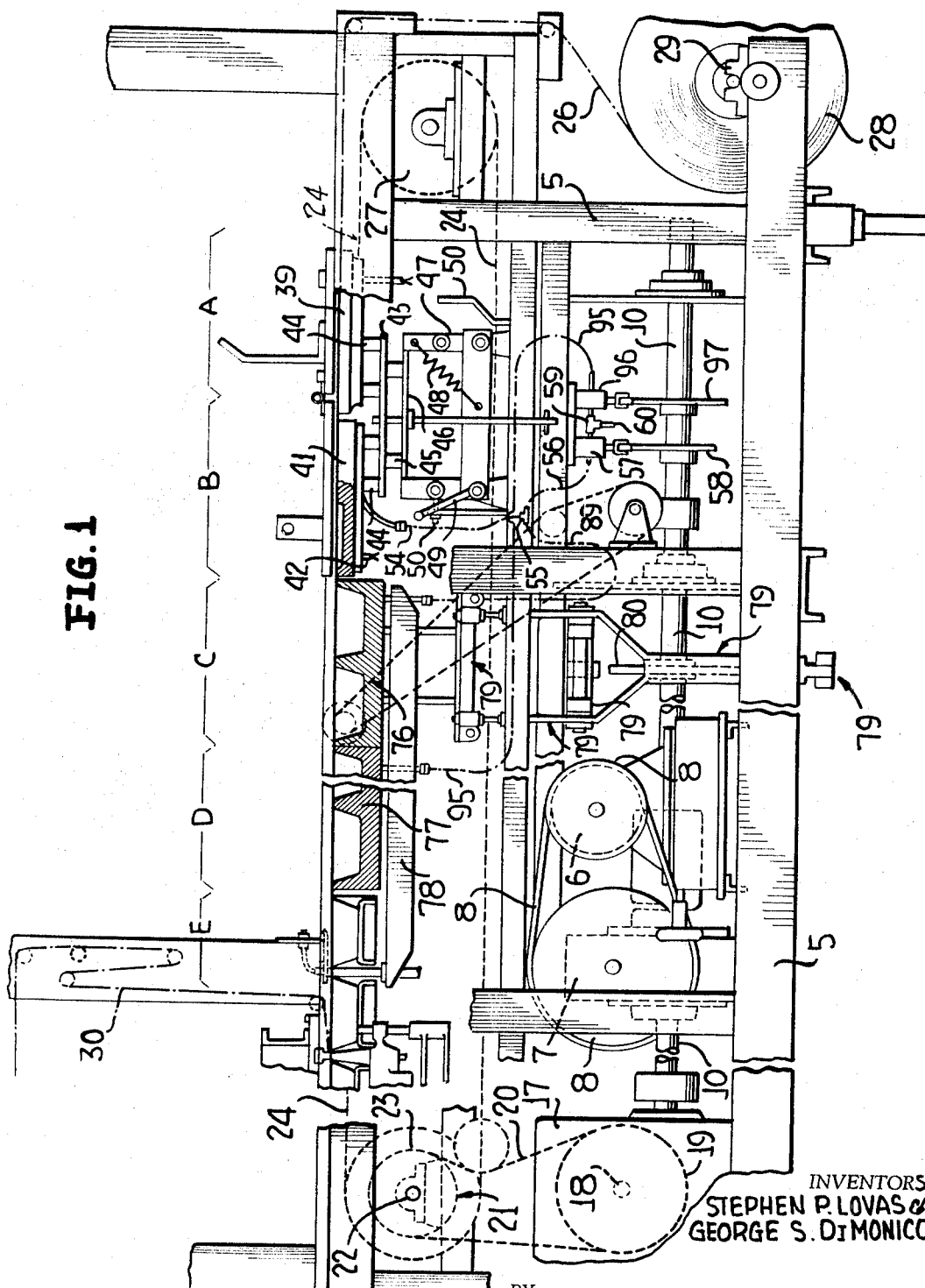

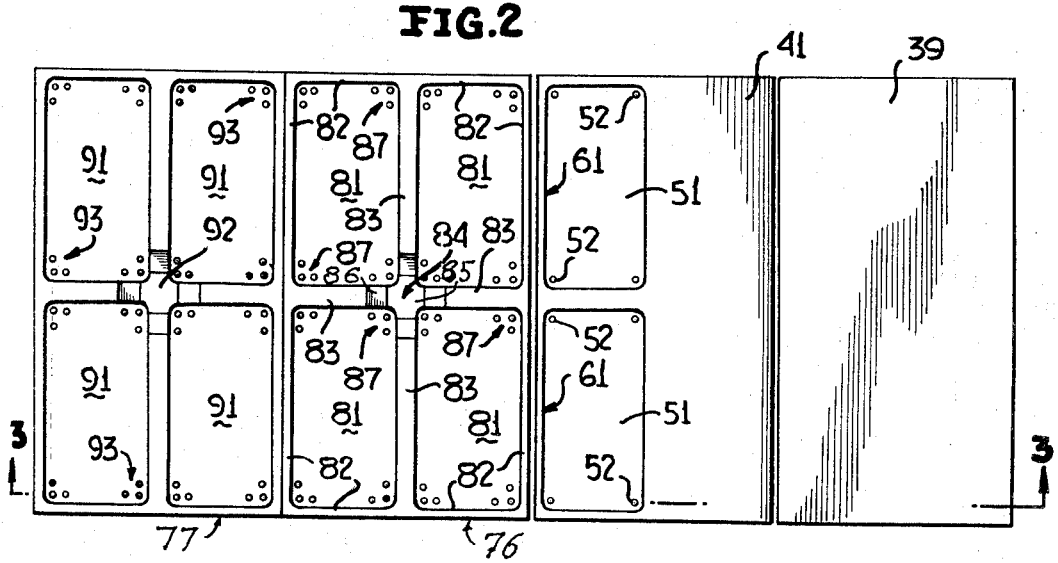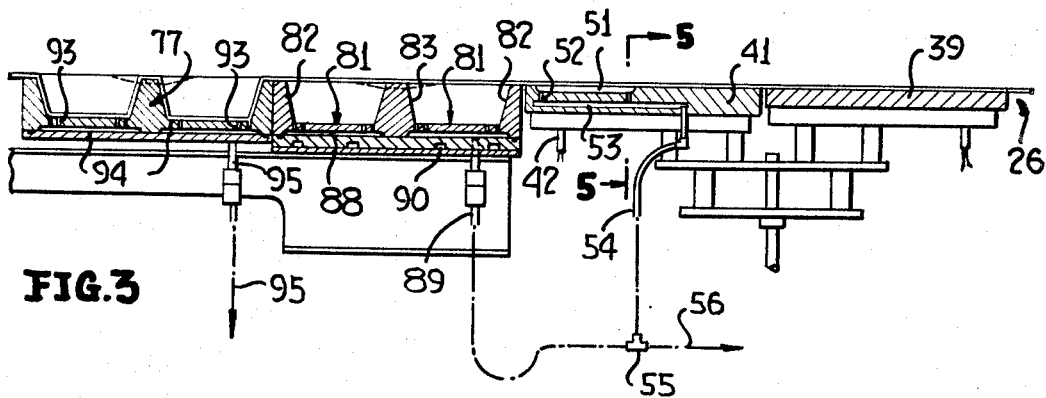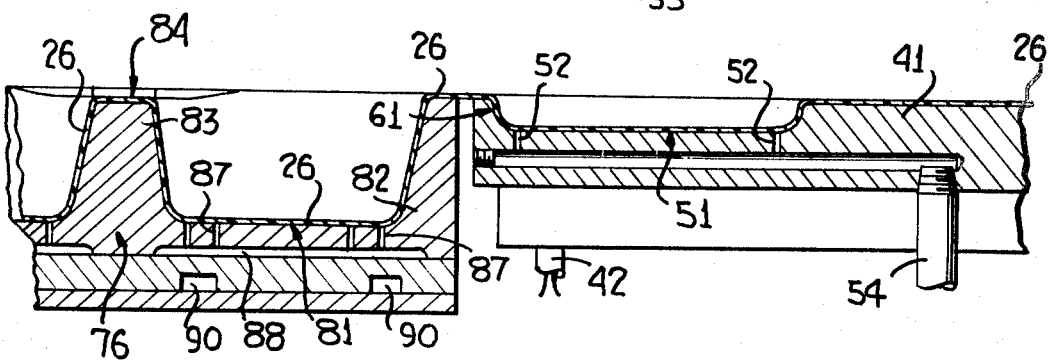

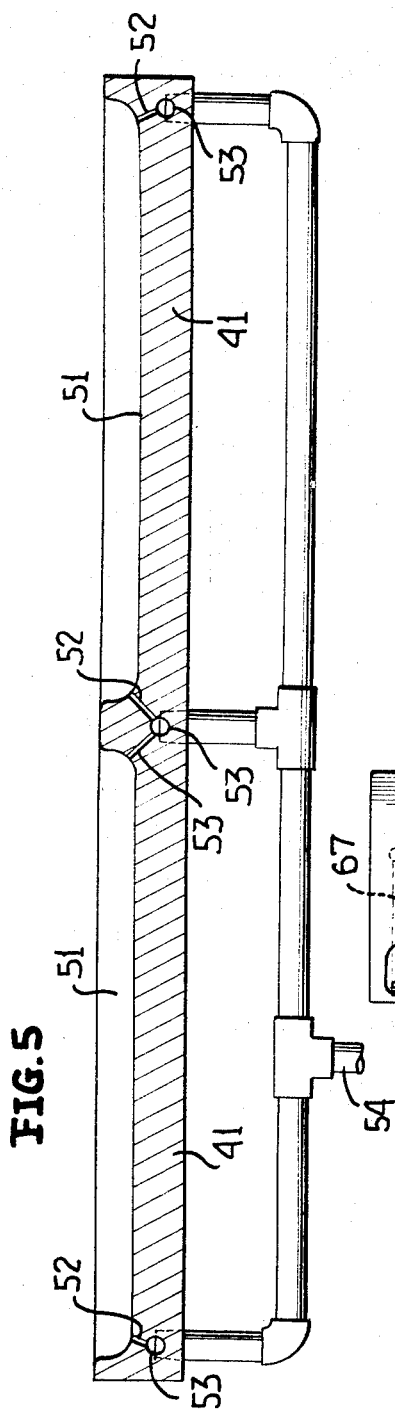
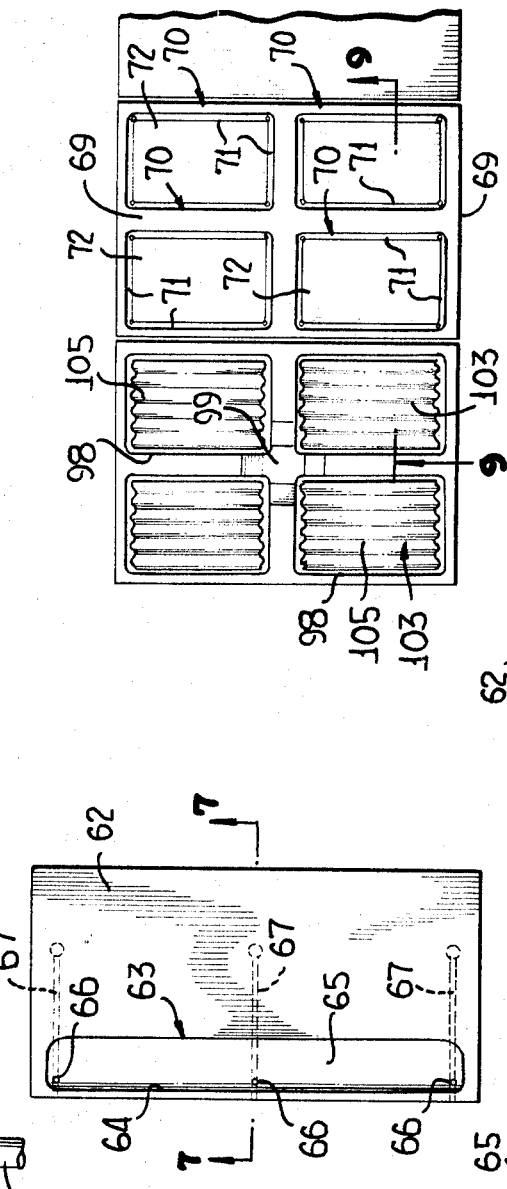
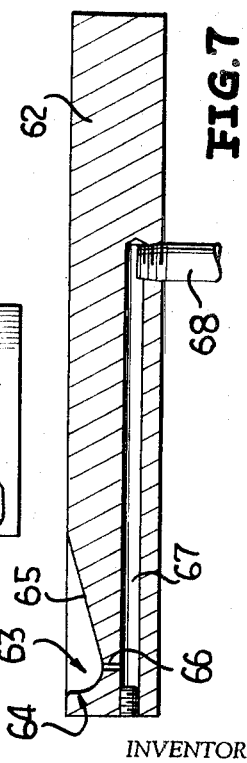
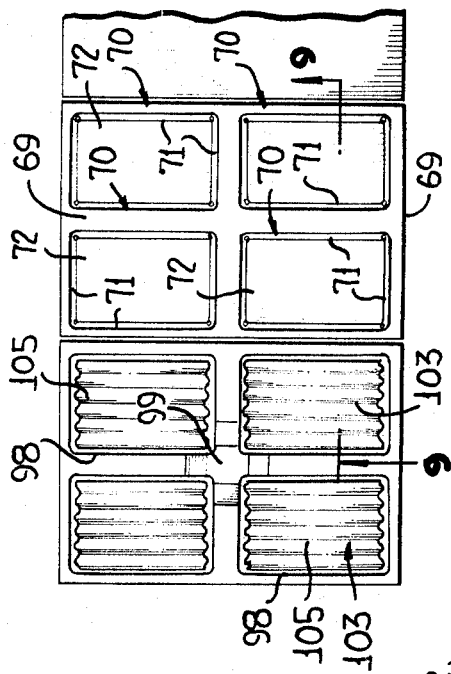

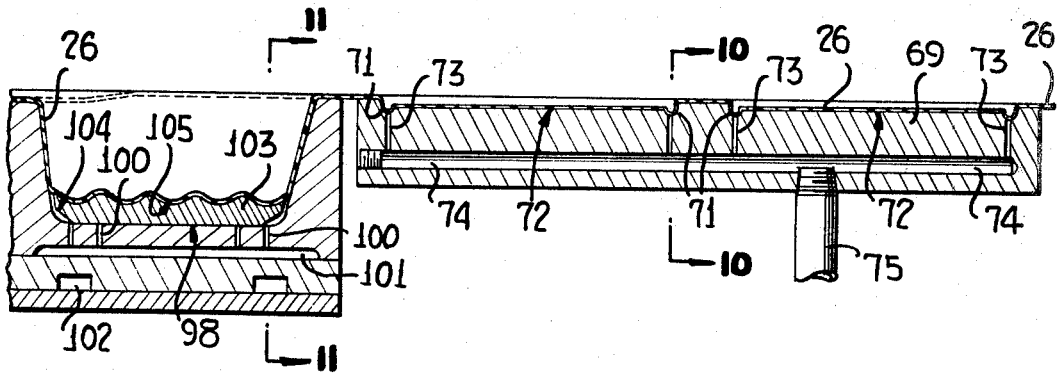
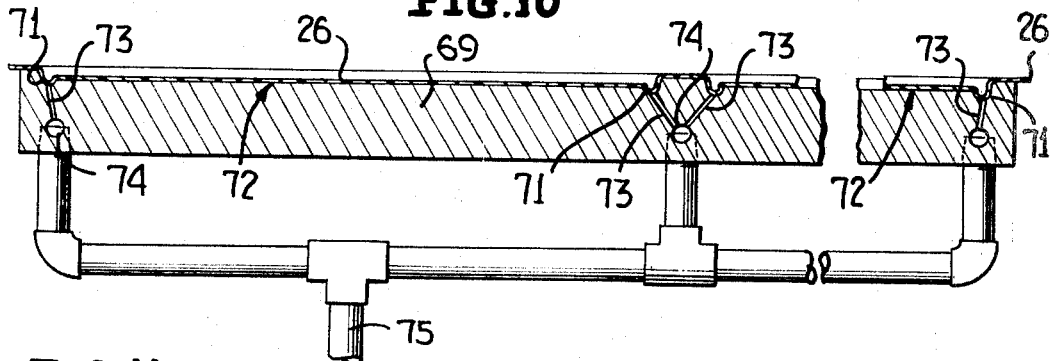
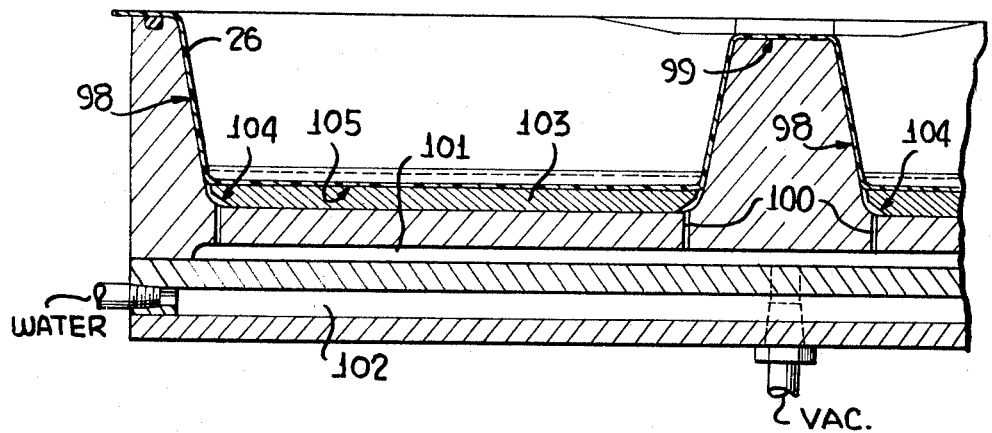

3,394,208
METHOD AND APPARATUS FOR FORMING FILL RECEIVING POCKETS IN WEBS
Stephen P. Lovas, West Hempstead, N.Y., and George S. Di Monico, Waldwick, N.J., assignors to Royal Packaging Equipment, Inc., Hackensack, N.J., a corporation of New Jersey
Original application Feb. 4, 1964, Ser. No. 342,430, now Patent No. 3,347,011. Divided and this application Aug. 17, 1967, Ser. No. 661,290
17 Claims. (Cl. 264—92)

ABSTRACT OF THE DISCLOSURE

A method and apparatus to be employed in packaging of products in flexible plastic pockets formed from continuous rolls of moldable web material wherein and whereby a web is advanced horizontally while being gripped at its marginal edges only, heated to facilitate pocket molding, first preformed to provide shallow pockets by differential fluid pressure action and shaping cavity engagement, followed by similar final shape molding, thus to avoid objectionable tensioning of the web, accompanied by shoulder wrap contact holding during heating and shallow molding and the final shape molding against drawing of any objectionable amount of the web toward the web portion being given its final molded shape, provision also being made to cause pockets to conform generally to the contour of fill portions to be received in the molded pockets.

---

This application is a division of the copending application for U.S. Letters Patent Ser. No. 342,430, filed by Stephen P. Lovas and George S. Di Monico on Feb. 4, 1964, and entitled Packaging Machine and Method of Forming Packages.

The identified parent application covers a machine and method for the vacuum packaging of products in flexible plastic pockets formed from continuous rolls of heat sealable webs wherein a first web is drawn from a roll and moved step-by-step by margin gripping conveyor means, heated, differential pressure molded at one station into pocket clusters each divided by wall portions depressed at a centrally intersecting point, the molded pockets being held by a differential pressure action and cooled at a succeeding station in the molded shape and against memory relaxation, fill being deposited in the molded and held pockets, an evacuating orifice being formed at the depressed intersection point, a cover web then being applied over the filled pockets and heat sealed thereover except at the intersecting point, an enclosing chamber then being formed about a there presented filled pocket cluster at another station, the pockets being there interiorly evacuated through the evacuating orifice and the chamber being evacuated about the enclosed cluster, followed by ring sealing of the cluster about its orifice, followed by a venting of the chamber to atmosphere to cause the pockets to conform in shape to the fill therein, after which, and at another station, completing heat sealing is performed at the previously non-sealed intersection point, followed at succeeding positions by dividing of the clusters into individual packages by transverse and longitudinal cutting of the heat sealed webs.

The present invention has for a purpose the provision of a novel method and apparatus, employable in subcombination and not necessarily in the particular fully disclosed and claimed form of the parent application, and effective to very efficiently provide more perfectly and practically shaped fill receiving pocketing in the web material, without objectionable tensioning and/or stressing of said material.

An object of the invention is to provide novel method and means for holding the web, by fluid pressure action, intimately against and in all-over surface contact with a hot plate just prior to the formation of the desired fill receiving pockets therein at the pocket molding station.

Another object is to provide novel method and means for forming shallow pockets in the web during the preheating thereof, said pockets being placed so that they will provide prestretched, tension release areas conforming to the pocket arrangements to be molded and from which said pocket arrangements will be formed.

Another object of the invention is to provide novel method and means for presenting holding shoulders at the web preheating station and effective to prevent objectionable drawing of web material from the heating station and into the pocket forming mold cavities as the vacuum shaping is in progress in said cavities.

With the above and other objects in view that will hereinafter appear, the nature of the invention will be more clearly understood by reference to the following detailed description, the appended claims and the several views illustrated in the accompanying drawings.

In the drawings:

FIGURE 1 is a somewhat fragmentary and schematic side elevation of package forming machine structure embodying the present invention.

FIGURE 2 is a plan view illustrating an improved arrangement of heating means for conditioning the web for the vacuum forming of fill receiving pockets therein.

FIGURE 3 is a vertical longitudinal sectional view taken on the line 3—3 on FIGURE 2.

FIGURE 4 is an enlarged fragmentary vertical longitudinal section showing a portion of the preheating and shaping means and a portion of the forming mold of FIGURES 2 and 3.

FIGURE 5 is an enlarged vertical cross section taken on the line 5—5 on FIGURE 3.

FIGURE 6 is a plan view of a modified form of web heating and preshaping or holding plate.

FIGURE 7 is a vertical cross section taken on the line 7—7 on FIGURE 6.

FIGURE 8 is a view similar to FIGURE 2 illustrating another modified arrangement of web heating and preshaping plate and a cooperating portion of a modified arrangement of forming mold.

FIGURE 9 is an enlarged fragmentary longitudinal sectional view taken on the line 9—9 on FIGURE 8.

FIGURE 10 is an enlarged vertical cross sectional view taken on the line 10—10 on FIGURE 9.

FIGURE 11 is an enlarged fragmentary vertical cross sectional view taken on the line 11—11 on FIGURE 9.

In the example of embodiment of the invention herein disclosed, namely that of the parent application hereinabove referred to, the machine frame structure is generally designated 5 and supports thereon a driving motor 6 arranged to drive a speed reducer 7 of any approved type through driving pulley and belt means generally designated 8. See FIGURE 1. The speed reducer serves to impart the desired rotation to shaft means 10 and therethrough to an indexing unit 17 of any approved type the power output shaft 18 of which carries a driver sprocket 19. The driver sprocket 19 is chain coupled at 20 to impart rotation to the driver sprocket 21 on the cross shaft 22 whereon the chain driving sprockets 23 are mounted, thereby to impart intermittent or step-by-step movement to the web feeding chains schematically indicated at 24 and which are to be assumed as equipped with the web margin gripping clamps illustrated in detail in the hereinabove mentioned parent application but not shown herein. The chains pass over idler sprockets 27 at the web receiving end of the machine at the right of FIGURE 1.

The lower web 26 is drawn off a supply roll 28 supported at 29 on the frame and is the web which is to have fill receiving pockets formed therein.

In the machine of said parent application the upper flights of the web feeding chains, moving from right to left as viewed in FIGURE 1 initially pass a first web preheating station A, then a second preheating and holding station B, a pocket cluster forming station C, a pocket holding and filling station D and then a lower web orificing station E at which a web orificing means is located. After being orificed at station E the pocketed and orificed web with its filled pockets has a cover web applied thereover as shown at 30 at the left in FIGURE 1 and then is moved on through an initial sealing station, a package evacuating station, a final sealing station and through package cluster separating means all as clearly shown and described in the herein referred to parent application but none of which are of importance in this particular disclosure, and hence are not shown or described herein.

At station A, the lower web 26 being carried by the chains passes over and in contact with a preheater plate 39, the web 26 passes through station B and over a heating and holding plate located at said station and generally designated 41, the same being similarly heated by rod type heaters serviced by conducting means indicated at 42. The preheating and heating and holding devices or plates 39 and 41 are secured on a common carrier 43 through insulators 44, and the carrier is mounted at 45 on a platform 46. See FIGURES 1 and 3. The platform 46 is supported on toggle link supports 47 spring biased at 48 to the plate elevated position illustrated in FIGURE 1, and the links are subject to being manually shifted to a toggle break, plate lowered position by manipulation of a swingable hand lever 49. Stop means 50—50 are provided to fix the raised or effective and lowered or ineffective positions of the plates 39 and 41.

FIGURES 2 to 5 show in greater detail the preheating and preheating and holding devices positioned at stations A and B and the relation they bear to the last encountered pocket cluster forming or molding and holding devices at stations C and D. The preheating and holding plate generally designated 41 is here shown as equipped with two shallow holding pockets 51 arranged side-by-side and each having at least one evacuating orifice 52 at each corner thereof and communicating through chambering 53 in the plate with a duct 54. The duct 54 is connected with a T 55 which is in turn connected through a duct 56 with the valve 57 illustrated in FIGURE 1 and which is operable by a rotary cam 58 carried by the shaft 10. The valve 57 also is connected at 59 with a vacuum source 60 which may be a vacuum pump (not shown).

It will be apparent that the shallow pockets 51 present holding shoulders 61, and the purpose of these shoulders will be described in greater detail hereinafter.

In the modified form of preheating and holding plate means illustrated in FIGURES 6 and 7, there is provided a plate 62 having a single transverse pocket 63 formed therein, the same presenting a holding shoulder 64 and having a gradually and upwardly sloping bottom 65. Evacuating orifices 66 are provided in the pocket 63 and communicate through chambering 67 with a duct 68 for connection with the previously mentioned control valve means and vacuum source.

In another modified form of preheating and holding means provision also is made for preshaping portions of the lower web which are to be formed into the fill receiving pockets. This plate structure is best illustrated in FIGURES 8 through 10 wherein the preheating, holding and preforming plate is generally designated 69 and is equipped with a cluster of four shallow pockets 70 generally corresponding in placement to the positions of the fill receiving pockets to be molded at station C. Each pocket 70 is defined by a peripheral groove or depression 71 about its center or relatively higher floor portion 72, and each such groove 71 is provided at each corner with an evacuating orifice 73 communicating through chambering 74 with an evacuating duct 75 for connection with the previously mentioned vacuum control valve and vacuum source.

Preheating and holding means as previously described and shown in FIGURES 2 to 11 are particularly desirable where the packaging involves the use of webs or films which shrink and develop tension upon heating. This is true of so-called bi-oriented films, that is, films which have been prestretched to some degree in both longitudinal and transverse directions during their making with forming type, high-clarity Mylar.

The two side-by-side pockets 51—51 of FIGURES 2 to 5 provide shallow recesses which may be evacuated in the manner stated and which present advance shoulders or holding edges 61 directed toward the forming mold at station C. Like the holding mold at station D the shoulders 61—61 and cavities 51—51 hold the last formed cluster of cavities from distorting or losing intended shape by memory action when the action of the forming mold exerts strong stretching forces on the hot web as it is being drawn. Prior to the provision of such holding pockets, the forming operation at station C pulled some web or film from over the heater plate, and upon release of the forming vacuum, the web tended to return to the heater plate from whence it came, or in other words shrunk back. This caused deformation of the cavities. However, with the addition of the holding and preheating pockets above described, the hot web is easily sucked down to the bottom of the heater plate pockets before the web over the forming cavities produces much forming strain, even though the vacuum timing for both the preheating and holding devices and forming mold are of the same value. This order of forming in two stages is largely due to the fact that the web is hottest over the hot plate, and also the web gains still more heat as it draws into the hot cavity, as against the web losing heat as it draws into contact with the water cooled forming mold at station C.

Successful holding in the manner stated is attributed to two important effects, namely the combined action of vacuum in the heater-holding pockets, and frictional wrap effect around holding shoulders such as those presented at 61 and 64 as previously described. This is accomplished in the structure shown in FIGURES 6 and 7 wherein the sloping bottom is provided, but it is to be understood that in this form the recess or cavity should not be too narrow so as to get a stronger total vacuum pull, and it has been found that the sloping or tapering depth helps to prevent telltale lines which might remain in the formed web.

An extra stretching effect is added in the web in the preheater pocket areas which, even though the web practically snaps back into a flat plane when the vacuum is released, there is enough stretch in these areas to temporarily release the tension in the remainder of the web over the heater plates which would otherwise cause a degree of cavity distortion. This tension release lasts long enough to enable the newly formed web cavities or pockets to be advanced to the holding mold station D.

The four shallow cavities 70 in the final stage hot plate illustrated in the form of FIGURES 8 to 10 permit tight drawing of the web into positive overall contact with the hot surfaces of the plate. This is extremely important in the provision of uniform heating and avoidance of streaky hot spots caused by local stretching imperfections in formed cavities or pockets. It is known that materials such as nylon-polyethylene have a tendency to become limp and wavy upon heating and lacking of means for stretching the film to the desired flat condition. Thus they contact the hot plate surface in spotty and random places, causing the streaky hot spots and local imperfections referred to. The hot spots (hot as related to the under-heated cooler portions of the web) are eliminated in the practicing of the herein disclosed invention by the vacuum sucking down of the entire web into the shallow cavities for uniform overall contact with the hot plate. It has been pointed out previously that a material such as Mylar-polyethylene required vacuumizing recesses for a holding feature only because of its characteristic shrinking when heated, and although four cavities are not necessary for its proper heating, the four cavities do not hamper its proper heating. Therefore, this four pocket arrangement can be universally used with any material. It is to be noted that the peripheral channel 71 in each of the shallow pockets of FIGURES 8 to 10 helps to maintain a vacuum supply to all areas of the web until the last possible moment when the web finally tends to seal over the evacuating holes 73 in each corner. This minimizes the possibility of leaving air entrapped in central portions of any one of the cavities, as illustrated in FIGURES 9 and 10.

Whenever film is being formed which does not develop tension upon heating, no heater pockets should be used. At such times the evacuated pockets intended for the described tension release effect may be filled by the laying in of loose filler plates of aluminum or other acceptable material, thus to present upwardly a planar, unpocketed surface.

Reference is now made to FIGURES 1 and 2 through 4 and stations C and D whereat are located the pocket shaping mold generally designated 76 and the pocket holding mold generally designated 77. Both molds 76 and 77 are supported on a vertically reciprocable platform or carrier 78 operable by lifting and lowering devices generally designated 79 including upright lifter bracket means and horizontally disposed supporting linkage as disclosed in our previously mentioned presently pending patent application, or any other acceptable lifting and lowering means may be employed. The lifting and lowering devices here generally illustrated and designated 79 are actuated by the rotary cam 80 on the shaft 10, as illustrated in FIGURE 1.

The forming or shaping mold best illustrated in FIGURES 1 to 4 provides a cluster of four molding pockets 81 arranged in two side-by-side pairs. The pockets are defined by peripheral upstanding wall portions 82 and centrally intersecting wall portions 83. At the intersection of the wall portions 83 there is provided a cruciform depression generally designated 84 and defined by a central, depressed planar portion 85 and four downwardly sloping depressions 86 extending from the full height positions of the wall portions 83 down to the lower central planar portion 85. Each pocket 81 is shown as having three evacuating orifices 87 in each corner and communicating with chambering 88 beneath the pockets and which in turn connects through the duct 89 with the previously mentioned T 55 and the duct 56 leading to the valve 57 and the vacuum source 60. The mold 76 also has chambering 90 which is to be understood as connected with a cooling water supply (not shown).

The pockets 91 in the holding mold 77 are defined by peripheral and intersecting portions as are the previously described molding pockets 81 and include the cruciform depression 92 and corner orifices 93. The evacuating corner orifices 93 communicate with the underlying chambering 94 which in turn is connected through the evacuating duct 95 with the T 59 and vacuum source 60 through the control valve 96 which is actuated by the rotary cam 97 on the shaft 10.

In FIGURES 8 through 11, a modified arrangement of forming mold is shown. The pockets 98 in this modified mold also are defined by peripheral and intersecting walls providing the cruciform central depression 99 as previously described. The corner disposed evacuating orifices 100 also are provided and communicate with the bottom chambering 101 for the purposes previously described. The mold also includes the coolant circulating chambering at 102. However, the pockets in this modified mold each has a shaping bottom or filler block 103 laid therein, the same being shaped as at 104 to be spaced away from adjacent upstanding wall portions of the mold to avoid interference with the drawing of a vacuum in the pockets 98 through the corner orifices 100. The filler blocks 103 have upwardly presented shaped surfaces as indicated at 105, these surfaces being defined in accordance with the fill to be placed in the packages, being irregular or otherwise shaped to conform at least generally to the fill or portions thereof which are to engage the bottom of the package, and therefore the bottom of the pockets to be vacuum drawn or shaped in the mold cavities as clearly illustrated in FIGURE 9.

It is to be understood that while preformed forms of web heating, premolding, holding and final shape molding are shown and described in detail herein, in part form and performance may be made without departing from the spirit and scope of the invention as defined in the appended claims.

We claim:

1. In a method of forming packages, the steps of feeding a heat sealable web step-by-step and horizontally while gripping the same as its marginal edges only, heating a web portion over a hot plate to prepare the web portion for subsequent formation of deep pockets therein, advancing the heated web portion from the hot plate to a pocket forming station and there vacuum forming deep pockets in the heated web portion while holding the web by shoulder wrap contact at the hot plate against drawing of any objectionable amount of the web from over the hot plate toward the heated web portion as it is being drawn into pockets as aforesaid.

2. The method steps defined in claim 1 further characterized by the fact that the shoulder wrap contact is provided incidental to the step of vacuum forming shallow pocketing in the web over the hot plate with said pocketing conforming at least in part to the shape and positioning of the deep pocketing to be vacuum formed in the web after the next succeeding step advance of the web from the position of the hot plate.

3. The method steps defined in claim 1 further characterized by the fact that the shoulder wrap contact is provided incidental to the step of vacuum forming shallow pocketing in the web over the hot plate with said pocketing conforming to the shape and positioning of the deep pocketing to be vacuum formed in the web after the next succeeding step advance of the web from the position of the hot plate.

4. In a package forming machine, means for feeding a web of forming film step-by-step, a heater plate means over which the web engages and which serves to preheat the web and condition it for the shaping of fill receiving pockets therein, means for holding the web in all over surface contact with the plate by fluid pressure action, a pocketed mold over which the web is placed as it is fed away from the plate, and means for evacuating the mold pockets to vacuum-pressure shape the web in pocket cluster form in the mold.

5. A package forming machine structure as defined in claim 4 wherein said heater plate is provided with shoulder means traversing the line of feed of the web and facing away from the pocketed mold to resist drawing of web portions from the plate and into pocketing in the mold.

6. A package forming machine structure as defined in claim 4 wherein said heater plate is provided with shoulder means traversing the line of feed of the web and facing away from the pocketed mold to resist drawing of web portions from the plate and into pocketing in the mold, said heater plate also having shallow pocketing therein effective in conjunction with the fluid pressure action to provide shallow pocketing in the web in advance of presentation of the particular web portion to the pocket shaping mold thereby to counteract objectionable building up of tension in the web as a result of the preheating thereof.

7. A package forming machine structure as defined in claim 4 wherein said heater plate is provided with shoulder means traversing the line of feed of the web and facing away from the pocketed mold to resist drawing of web portions from the plate and into pocketing in the mold, said heater plate also having shallow pocketing therein effective in conjunction with the fluid pressure action to provide shallow pocketing in the web in advance of presentation of the particular web portion to the pocket shaping mold thereby to counteract objectionable building up of tension in the web as a result of the preheating thereof, said heater plate pocketing conforming in shape and arrangement to the pocketing in the shaping mold so that the web portions thus preshaped on the heater plate will later be presented at the mold pocketing and there be reshaped in the desired final form.

8. A package forming machine structure as defined in claim 4 wherein said heater plate is provided with shoulder means traversing the line of feed of the web and facing away from the pocketed mold to resist drawing of web portions from the plate and into pocketing in the mold, said heater plate also having shallow pocketing therein effective in conjunction wtih the fluid pressure action to provide shallow pocketing in the web in advance of presentation of the particular web portion to the pocket shaping mold thereby to counteract objectionable building up of tension in the web as a result of the preheating thereof, said heater plate pocketing conforming in shape and arrangement to the pocketing in the shaping mold so that the web portions thus preshaped on the heater plate will later be presented at the mold pocketing and there be reshaped in the desired final form, and each said plate pocket including a central planar floor surrounded by a shallow groove having evacuating orifices projected therethrough and connected with a vacuum source.

9. A package forming machine structure as defined in claim 4 wherein said heater plate is provided with shoulder means traversing the line of feed of the web and facing away from the pocketed mold to resist drawing of web portions from the plate and into pocketing in the mold, said heater plate also having shallow pocketing therein effective in conjunction with the fluid pressure action to provide shallow pocketing in the web in advance of presentation of the particular web portion to the pocket shaping mold thereby to counteract objectionable building up of tension in the web as a result of the preheating thereof, said heater plate pocketing conforming in shape and arrangement to the pocketing in the shaping mold so that the web portions thus preshaped on the heater plate will later be presented at the mold pocketing and there be reshaped in the desired final form, each said heater plate pocket being rectangular and including a central planar floor surrounded by a shallow groove having at least one evacuating orifice therein and projecting through the plate and connected with a vacuum source.

10. A package forming machine structure as defined in claim 4 wherein said mold pockets include bottom molding surfaces therein conforming generally in shape to bottom shaping of fill to be deposited in the shaped pockets, thereby to provide for a preshaping of the shaped pocket bottoms to substantially conform to the fill portion which is to engage thereover.

11. A package forming machine structure as defined in claim 4 wherein said mold pockets include bottom molding surfaces therein conforming generally in shape to bottom shaping of fill to be deposited in the shaped pockets, thereby to provide for a preshaping of the shaped pocket bottoms to substantially conform to the fill portion which is to engage thereover, said mold pockets also having evacuating orificing in bottom corners thereof and connected with a vacuum source, and filler plates laid in the mold bottoms in position for having evacuation of the pockets take place thereabout, the upper surfaces of said plates defining the effective bottoms of the pockets and presenting shape determining faces conforming generally to the contour of fill portions to be received in the pockets and in engagement with said filler plate faces.

12. A package forming machine structure as defined in claim 4 wherein said heater plate is provided with shoulder means traversing the line of feed of the web and facing away from the pocketed mold to resist drawing of web portions from the plate and into pocketing in the mold, and there being included means for vertically reciprocating the mold between an elevated pocket shaping position and a lowered out-of-the-way position permitting feeding away of the web and the pockets shaped therein by the mold.

13. A package forming machine structure as defined in claim 4 wherein said heater plate is provided with shoulder means traversing the line of feed of the web and facing away from the pocketed mold to resist drawing of web portions from the plate and into pocketing in the mold, said heater plate also having shallow pocketing therein effective in conjunction with the fluid pressure action to provide shallow pocketing in the web in advance of presentation of the particular web portion to the pocket shaping mold thereby to counteract objectionable building up of tension in the web as a result of the preheating thereof, and there being included means for vertically reciprocating the mold between an elevated pocket shaping position and a lowered out-of-the-way position permitting feeding away of the web and the pockets shaped therein by the mold.

14. A packaged forming machine structure as defined in claim 4 wherein said heater plate is provided with shoulder means traversing the line of feed of the web and facing away from the pocketed mold to resist drawing of web portions from the plate and into pocketing in the mold, said heater plate also having shallow pocketing therein effective in conjunction with the fluid pressure action to provide shallow pocketing in the web in advance of presentation of the particular web portion to the pocket shaping mold thereby to counteract objectionable building up of tension in the web as a result of the preheating thereof, said heater plate pocketing conforming in shape and arrangement to the pocketing in the shaping mold so that the web portions thus preshaped on the heater plate will later be presented at the mold pocketing and there be reshaped in the desired final form, and there being included means for vertically reciprocating the mold between an elevated pocket shaping position and a lowered out-of-the-way position permitting feeding away of the web and the pockets shaped therein by the mold.

15. A package forming machine structure as defined is claim 4 wherein said mold pockets include bottom molding surfaces therein conforming generally in shape to bottom shaping of fill to be deposited in the shaped pockets, thereby to provide for a preshaping of the shaped pocket bottoms to substantially conform to the fill portion which is to engage thereover, said mold pockets also having evacuating orificing in bottom corners thereof and connected with a vacuum source, and filler plates laid in the mold bottoms in position for having evacuation of the pockets take place thereabout, the upper surfaces of said plates defining the effective bottoms of the pockets and presenting shape determining faces conforming generally to the contour of fill portions to be received in the pockets and in engagement with said filler plate faces, and there being included means for vertically reciprocating the mold between elevated pocket shaping position and a lowered out-of-the-way position permitting feeding away of the web and the pockets shaped therein by the mold.

16. In a package forming machine, means for feeding a heat sealable web step-by-step and horizontally while gripping the same at its marginal edges only, means including a hot plate for heating a portion of the web to prepare it for subsequent formation therein of deep pockets, a pocket forming station to which the web is fed from the heating means and having thereat pocket shaping means and means for applying differential pressure action on the web to form deep pockets therein at said shaping means, and shoulder means for holding the web by shoulder wrap contact at the hot plate against drawing of any objectionable amount of the web from over the hot plate toward the heated web portion as it is being drawn into deep pockets as aforesaid.

17. Machine structure as defined in claim 16 wherein said shoulder means and shoulder wrap contact is provided by shallow pocketing in the hot plate conforming at least in part to the shape and positioning of the deep pocketing to be formed in the web at the pocket forming station, there also being included means for bringing about differential pressure action on the web over the hot plate to form shallow pocketing therein.

References Cited

UNITED STATES PATENTS

| | | |
|---|---|---|
| 1,904,268 | 4/1933 | Bronson. |
| 3,081,491 | 3/1963 | Blads. |
| 3,181,202 | 5/1965 | Martelli et al. |
| 3,218,379 | 11/1965 | Edwards |
| 3,341,893 | 9/1967 | Edwards. |
| 3,346,923 | 10/1967 | Brown et al. |

WILLIAM J. STEPHENSON, *Primary Examiner.*